W. M. JACKSON.
Teeth for Lifting Lodged Grain.
No. 65,750. Patented June 11, 1867.
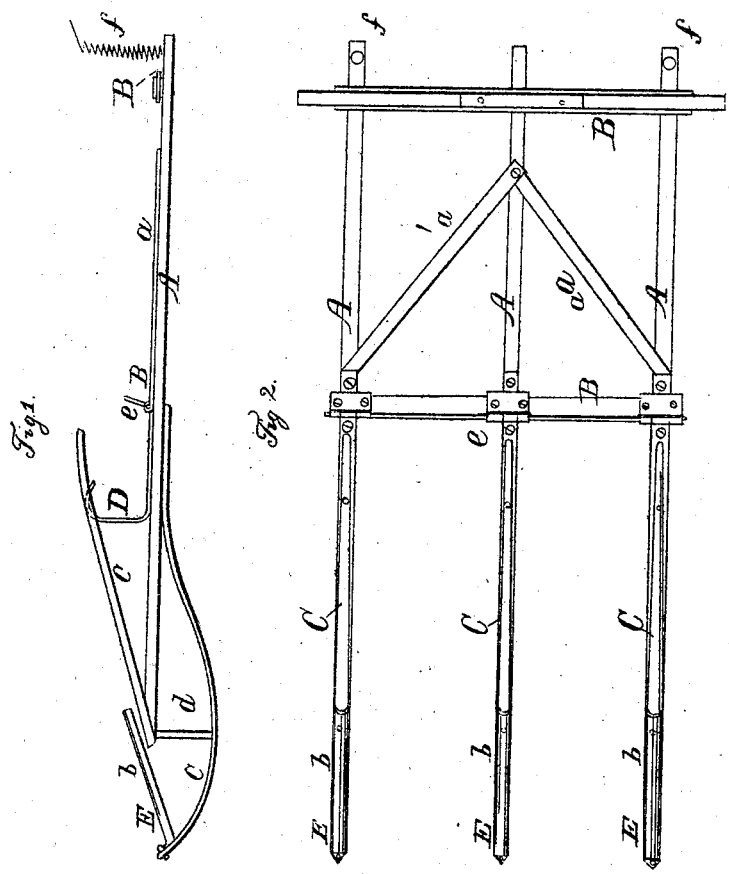

United States Patent Office.

WILLIAM MARCUS JACKSON, OF WOODLAND, CALIFORNIA.

Letters Patent No. 65,750, dated June 11, 1867.

---

IMPROVEMENT IN TEETH FOR LIFTING LODGED GRAIN.

---

*The Schedule referred to in these Letters Patent and making part of the same.*

---

TO ALL WHOM IT MAY CONCERN:

Be it known that I, WILLIAM MARCUS JACKSON, of Woodland, in the county of Yolo, and State of California, have invented a new and improved Grain-Elevator or Lifter; and I do hereby declare that the following is a full, clear, and exact description thereof, which will enable others skilled in the art to make and use the same, reference being had to the accompanying drawings forming part of this specification, in which—

Figure 1 is a side view of my invention.

Figure 2, a plan or top view of the same.

Similar letters of reference indicate like parts.

This invention relates to a new and improved attachment to be applied to reapers for the purpose of elevating lodged grain and bringing it within the reach of the reel so that the latter can present it properly to the sickle. The invention consists of a series of elastic shoes in connection with yielding fingers attached to suitable bars provided with supports for the fingers, and arranged so as to form frames or sections, all arranged to operate as hereinafter set forth.

A represents a series of parallel bars connected by cross-bars B, and braced, as shown at $a\ a$. To the front end of each bar A there is attached an inclined metallic strip, C. These strips serve as fingers, and they are allowed to yield or give to a certain extent, and are supported near their rear ends by elastic bars D, (see fig. 1.)

E represents what I term shoes, composed of metallic strips, $b$, the front ends of which are attached to the under sides of the bars A. The strips $b$ are supported from the bars $c$ by vertical rods $d$, which pass through the front ends of the fingers C, and serve as guides as well as supports, as will be fully understood by referring to fig. 1.

The frame or section is attached to the reaper by hinges $e$, the rear part of the frame or section having spiral springs $f$ attached to bear against the under side of the platform, or suitable fixtures attached thereto. This gives the whole apparatus a proper degree of elasticity. I design in practice to have two frames or sections attached to a reaper, placed side by side.

The shoes E, as the machine is drawn along, run under the lodged grain, the latter passing up the fingers C within reach of the reel, which presents the grain properly to the sickle. The shoes E, it will be seen, are allowed to yield or give so that they may conform to the inequalities of surface over which they may pass, and also pass readily over obstructions which may lie in their path, and the fingers C are also allowed to yield or give to the reel in case the latter comes in contact with them.

This invention has been practically tested, and has been found to operate well, raising the lodged grain and causing it to be cut with equally as great certainty as the standing grain.

I claim as new, and desire to secure by Letters Patent—

The elastic shoes, in combination with the yielding fingers applied to a frame or section, to be attached to a reaper, and all arranged to operate in the manner substantially as and for the purpose set forth.

The above specification of my invention signed by me this 15th day of September, 1866.

WILLIAM MARCUS JACKSON.

Witnesses:
LEWIS FRAZEE,
ARTHUR MONTEITH.